United States Patent
Beauge et al.

(10) Patent No.: US 7,219,492 B2
(45) Date of Patent: May 22, 2007

(54) SYSTEM FOR ASSISTING REGENERATION OF A STORAGE/RELEASING $NO_X$ TRAP FOR VEHICLE DIESEL ENGINE

(75) Inventors: Yvon Beauge, Rungis (FR); Ali Chaouche, Paris (FR); Djamal Medioun, Colombes (FR); Piet Ameloot, Neuilly sur Seine (FR); Mickael Gascoin, Colombes (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

(21) Appl. No.: 10/532,129

(22) PCT Filed: Oct. 2, 2003

(86) PCT No.: PCT/FR03/02896

§ 371 (c)(1),
(2), (4) Date: Apr. 20, 2005

(87) PCT Pub. No.: WO2004/038204

PCT Pub. Date: May 6, 2004

(65) Prior Publication Data

US 2006/0042231 A1  Mar. 2, 2006

(30) Foreign Application Priority Data

Oct. 23, 2002  (FR) .................................. 02 13255

(51) Int. Cl.
*F01N 3/00* (2006.01)
(52) U.S. Cl. ............................ 60/295; 60/278; 60/286; 60/301

(58) Field of Classification Search .................. 60/278, 60/286, 295, 301, 285
See application file for complete search history.

(56) References Cited

U.S. PATENT DOCUMENTS

| | | | |
|---|---|---|---|
| 5,775,099 A | * | 7/1998 | Ito et al. ........................ 60/274 |
| 6,082,325 A | | 7/2000 | Digeser et al. |
| 6,171,565 B1 | * | 1/2001 | Hohne et al. ............ 423/239.1 |

(Continued)

FOREIGN PATENT DOCUMENTS

EP  1 035 315 A2  9/2000

OTHER PUBLICATIONS

European Patent Office, Patent Abstracts of Japan, Publication No. 200018074, dated Jan. 18, 2000. (Cited in the international search report).

*Primary Examiner*—Thomas Denion
*Assistant Examiner*—Diem Tran
(74) *Attorney, Agent, or Firm*—Nicolas E. Seckel

(57) ABSTRACT

This system for assisting regeneration of a storage/release $NO_x$ trap integrated into an exhaust system (5) of a motor vehicle diesel engine (4) is characterized in that it includes means (11) for injecting fuel into the cylinders of the engine (4) in the form of pilot injections and main injections and means (12) for controlling the injection means (11) to switch the engine (4) periodically from a standard mode of operation using a lean mixture and pilot injection and main injection, in which $NO_x$ are stored in the trap (6), to a regeneration mode of operation using a rich mixture, with at least two pilot or main injections depending on the engine load, in which $NO_x$ are released from the trap (6) and the trap is regenerated.

17 Claims, 2 Drawing Sheets

U.S. PATENT DOCUMENTS

| | | | |
|---|---|---|---|
| 6,240,721 B1 * | 6/2001 | Ito et al. | 60/286 |
| 6,378,297 B1 * | 4/2002 | Ito et al. | 60/284 |
| 6,412,276 B1 | 7/2002 | Salvat et al. | |
| 6,536,209 B2 * | 3/2003 | Fluga et al. | 60/284 |
| 6,666,020 B2 * | 12/2003 | Tonetti et al. | 60/286 |
| 6,901,747 B2 * | 6/2005 | Tashiro et al. | 60/286 |

* cited by examiner

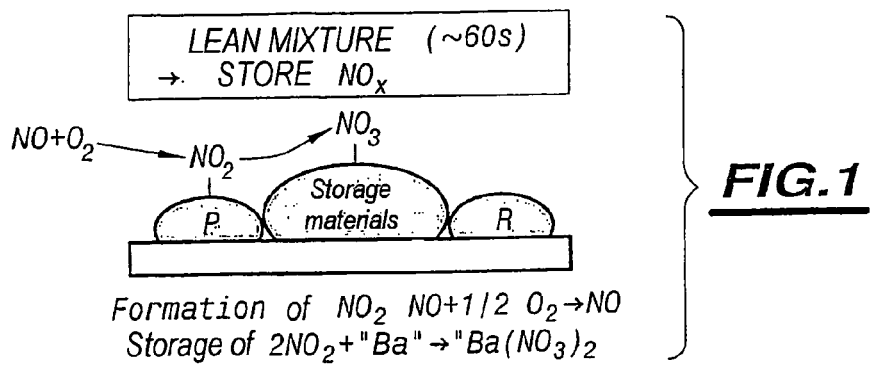
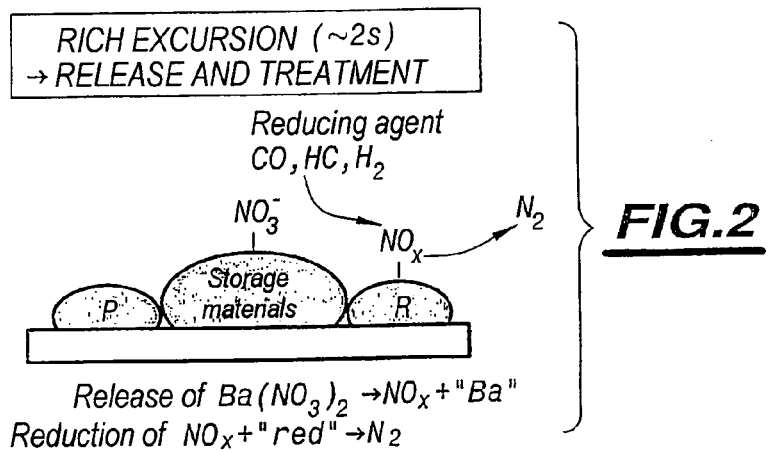
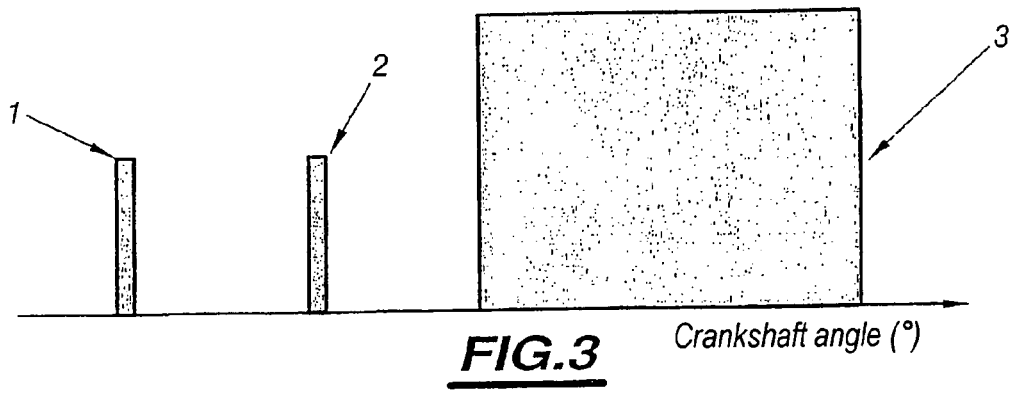
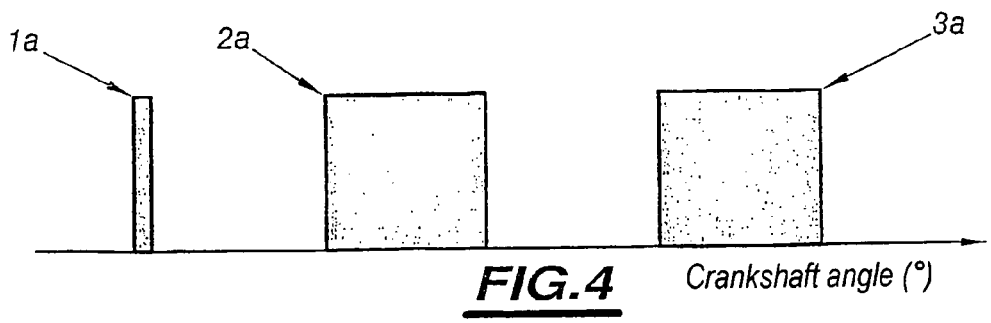

SYSTEM FOR ASSISTING REGENERATION OF A STORAGE/RELEASING NO$_x$ TRAP FOR VEHICLE DIESEL ENGINE

BACKGROUND OF THE INVENTION

The present invention relates to a system for reducing pollutant emissions associated with the operation of a motor vehicle diesel engine. It relates more particularly to a system for assisting the regeneration of a storage/release NO$_x$ trap integrated into a diesel engine exhaust system.

As is known in the art of direct injection motor vehicle diesel engines, reducing NO$_x$ emissions by DeNO$_x$ catalytic conversion of the storage/release type is one of the technical solutions envisaged for complying with the standards relating to this type of pollution and in particular the EURO IV standards.

To this end, it has been envisaged to use a NO$_x$ trap consisting of barium sulfate, for example, and adapted to absorb NO$_x$ during operation of the engine under standard conditions.

When the trap is saturated, a transient release phase is triggered by temporarily switching the engine from its standard mode of operation using a lean mixture to a regeneration mode of operation using a rich mixture, to produce reducing agents, such as HC and CO, for example; this reduces the NO$_x$, which are then desorbed from the trap, as in a traditional catalytic converter.

SUMMARY OF THE INVENTION

However, that causes problems with obtaining stable operation of the engine when using a rich mixture over its entire range of operating conditions, without impact on driver comfort, combustion noise, etc.

Thus the object of the invention is to solve these problems.

To this end, the invention consists in a system for assisting regeneration of a storage/release NO$_x$ trap integrated into an exhaust system of a motor vehicle diesel engine, characterized in that it includes means for injecting fuel into the cylinders of the engine in the form of at least pilot and main injections and means for controlling the injection means to switch the engine periodically from a standard mode of operation using a lean mixture with one pilot injection and one main injection, in which NO$_x$ are stored in the trap, to a regeneration mode of operation using a rich mixture, with at least two pilot or main injections depending on the engine load, in which NO$_x$ are released from the trap and the trap is regenerated.

According to other features of the invention:

the control means are adapted to control the injection means in the standard and regeneration modes of operation with two pilot injections or two main injections for engine loads less than or greater than a predetermined threshold value, respectively;

the predetermined load threshold value is defined by a brake mean effective pressure of approximately 3 bar;

for an engine associated with means for recirculating exhaust gas to its inlet side, the control means are adapted to regulate the operation of the recirculation means when the engine is using a rich mixture;

in the mode of operation with two pilot injections, the two pilot injections are triggered in a range from approximately 50° (crankshaft) to approximately 5° (crankshaft) ahead of top dead centre for the cylinder concerned and the main injection is triggered in an undercalibrated range up to approximately 35° (crankshaft) after top dead centre;

in the mode of operation with two main injections, the pilot injection is triggered for a range from approximately 50° (crankshaft) to approximately 5° (crankshaft) ahead of top dead centre for the cylinder concerned and the main injections are triggered in an undercalibrated range from approximately 20° (crankshaft) ahead of top dead centre to approximately 120° (crankshaft) after top dead centre;

the control means are adapted to control the injection means in order to operate the engine with a lean mixture for approximately 60 seconds and with a rich mixture for approximately 2 seconds;

the engine is associated with gas inlet means for admitting gas thereto and the control means are adapted to reduce the quantity of gas admitted into the engine when the latter is operating in its regeneration mode.

BRIEF DESCRIPTION OF THE DRAWINGS

The invention will be better understood on reading the following description, which is given by way of example only and refers to the accompanying drawings, in which:

FIGS. 1 and 2 show NO$_x$ storage and release phases in a trap constituting part of a system of the invention;

FIGS. 3 end 4 how the operation of fuel injector means used in an assistance system according to the invention.

DETAILED DESCRIPTION OF PARTICULAR EMBODIMENTS

Figure 5:
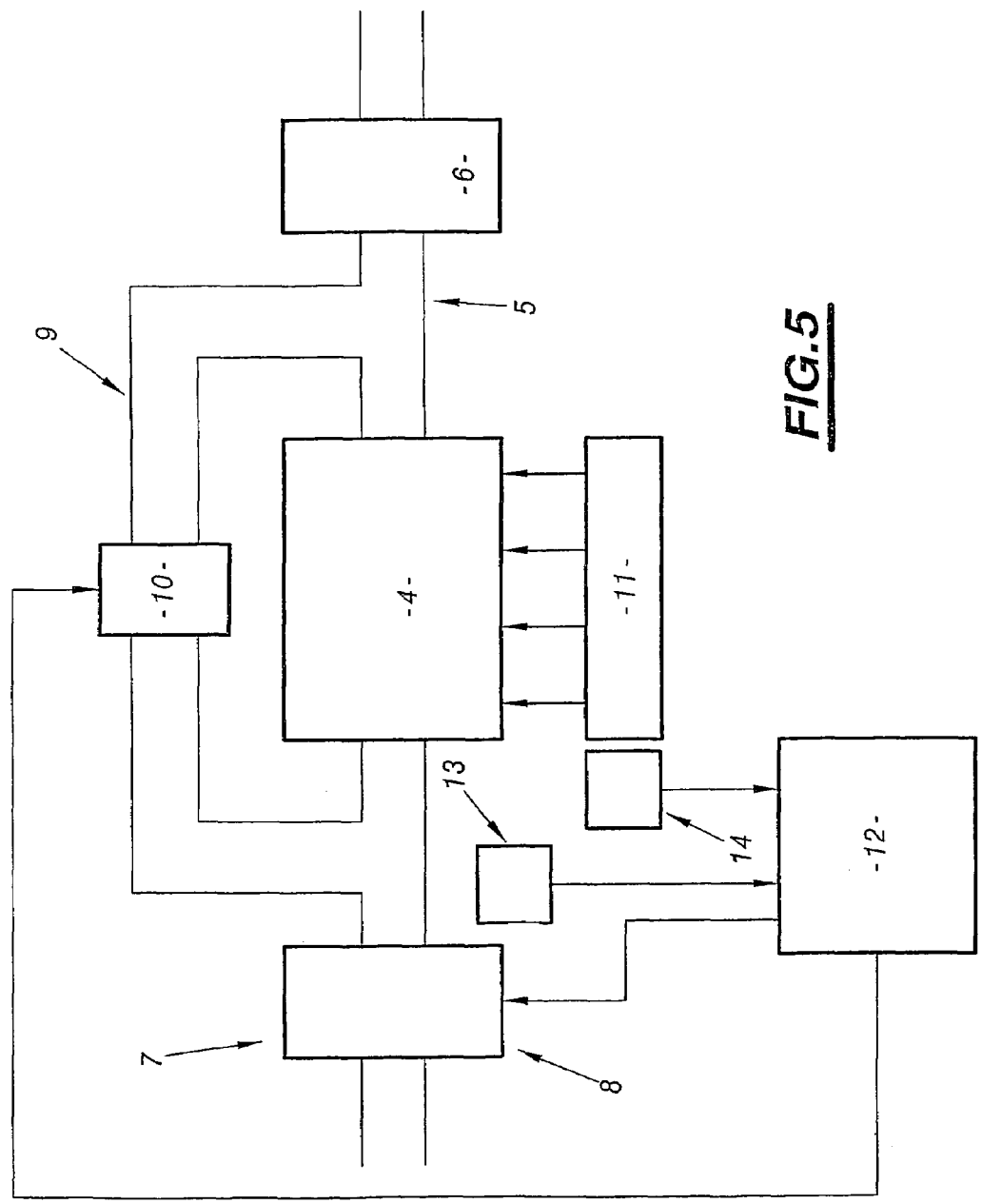
FIG. 5 is a block diagram showing the structure of a system of the invention.

As indicated above, the invention relates to a system for assisting the regeneration of a storage/release NO$_x$ trap integrated into the exhaust system of a motor vehicle diesel engine.

The storage and release phases are shown in FIGS. 1 and 2.

As has also been mentioned, the NO$_x$ trap absorbs NO$_x$ during operation of the engine under standard conditions using a lean mixture; in a regeneration mode of operation using a rich mixture, NO$_x$ are released and treated by the production of reducing agents such as HC and CO; this reduces the NO$_x$, which are then desorbed from the trap as in a conventional catalytic converter.

However, and as indicated above, the problem arises of obtaining stable operation of a diesel engine when using a rich mixture over the entire range of engine operating conditions without impacting on driver comfort and combustion noise, among other factors.

Changing to a stoichiometric or rich mixture is necessary to purge the NO$_x$ trap and eliminate sulfur, as sulfur in the fuel causes poisoning of the trap.

This operation takes longer than the purging operation, which takes only a few seconds, and is therefore more difficult to manage.

This being the case, assisting the regeneration of the above kind of storage/release NOx trap necessitates the development of a specific multiple injection strategy over the entire range of engine operating conditions, on the basis of a plurality of engine parameters.

In fact, the injection strategy must:

enable operation at an air-fuel ratio close to 1;

produce sufficient quantities of CO, which is the preferred reducing agent;

limit the level of $O_2$;

limit the level of HC;

conform to the level of fumes;

conform to the exhaust gas temperature, for reasons of mechanical strength; and, finally conform to the services provided to customers, namely driver comfort and engine operating noise.

To this end, the present invention proposes improving the stability and noise aspects of the combustion characteristics over the various load points of the engine by applying an injection strategy using two pilot injections or two main injections, as shown in FIGS. 3 and 4.

Moreover, exhaust gas recirculation (EGR) is regulated over all of the load points of the engine, to conform to the $NO_x$ trap regeneration criteria.

At low load points, for example at a brake mean effective pressure (BMEP) below approximately 3 bar, the strategy employing two pilot injections satisfies the $NO_x$ trap regeneration criteria because it significantly reduces combustion instabilities caused by the phasing of the two pilot injections, reduces noise (also due to the phasing of the two pilot injections), delays the main injection, and finally generates an engine map for the regeneration of the $NO_x$ trap based on a unique strategy.

As indicated above, this strategy may be applied at low load operating points of the engine, at which the EGR level is regulated.

This is shown in FIG. 3, which shows the two pilot injections 1 and 2 and the main injection 3.

The two pilot injections may be triggered in a range from approximately 50° (crankshaft) to 5° (crankshaft) ahead of top dead centre for the cylinder concerned, and the main injection may be triggered in an undercalibrated range up to approximately 35° (crankshaft) after top dead centre.

At higher load points, for example for a brake mean effective pressure exceeding approximately 3 bar, the strategy with two main injections is applied, which satisfies the criteria referred to above and further maintains the temperature of the exhaust gases within permissible limits for the engine structure (engine block, valves, manifold, etc.).

Once again, exhaust gas recirculation (EGR) is regulated to comply with $NO_x$ trap regeneration criteria.

This is shown in FIG. 4, which shows the pilot injection 1a and the two main injections 2a and 3a.

The pilot injection may then be triggered in a range from approximately 50° (crankshaft) to 5° (crankshaft) ahead of top dead centre for the cylinder concerned and the main injections may be triggered in a range from approximately 20° (crankshaft) ahead of top dead centre to approximately 120° (crankshaft) after top dead centre.

FIG. 5 shows a motor vehicle diesel engine 4 whose outlet side is connected to an exhaust system 5 into which a $NO_x$ trap 6 is integrated.

The engine is also associated with air inlet means 7 comprising means 8 for adjusting the quantity of air admitted.

The engine may also be associated with means 9 for recirculating exhaust gas to its inlet side associated with gas circulation control means 10.

For the purposes of exhaust gas recirculation (EGR), the recirculation means are therefore connected between the outlet side and the inlet side of the engine.

The adjusting means 8 and the control means 10 may comprise controllable valves, in the conventional way.

Moreover, the engine is also associated with means 11 for injecting fuel into its cylinders in the form of pilot and main injections, as mentioned above, and having any appropriate structure.

The various means described, i.e. the gas recirculation means, the air inlet means, and the injection means, are controlled by control means 12 comprising any appropriate computer receiving as input, for example, engine rotation speed and injection pressure information, from respectively corresponding data acquisition means 13 and 14, for determining operation with two injections or two main injections, according to the engine load.

The control means 12 may switch periodically between the standard mode of operation using a lean mixture, in which $NO_x$ are stored in the trap, and the regeneration mode of operation using a rich mixture, releasing $NO_x$ from the trap and therefore regenerating the trap, the engine 4 operating with a lean mixture for approximately 60 seconds and a rich mixture for approximately 2 seconds, for example. The control means 12 then operate on the air inlet means 7 for admitting air into the engine 4 and the injection means 11 for injecting fuel into the cylinders thereof to switch the engine periodically from the standard operating mode using a lean mixture to the regeneration operating mode using a rich mixture.

The control means 12 may be adapted to control the gas inlet means to reduce the quantity of gas admitted into the engine when it is operating in its regeneration mode and to control the injection means in the manner indicated above.

The control means may equally be adapted to regulate the operation of the means 9 for recirculating the exhaust gas when the engine is using a rich mixture.

Of course, other embodiments may be envisaged.

The invention claimed is:

1. A system for assisting regeneration of a storage/release $NO_x$ trap integrated into an exhaust system of a motor vehicle diesel engine, which includes means for injecting fuel into the cylinders of the engine in the form of at least pilot and main injections and means for controlling the injection means to switch the engine periodically from a standard mode of operation using a lean mixture with one pilot injection and one main injection, in which $NO_x$ are stored in the trap, to a regeneration mode of operation using a rich mixture, with at least two pilot or main injections depending on the engine load, in which $NO_x$ are released from the trap and the trap is regenerated, and wherein the control means are adapted to control the injection means in the standard and regeneration modes of operation with two pilot injections or two main injections for engine loads less than or greater than a predetermined threshold value, respectively.

2. A system according to claim 1, wherein, in the mode of operation with two pilot injections, the two pilot injections are triggered in a range from approximately 50° (crankshaft) to approximately 5° (crankshaft) ahead of top dead centre for the cylinder concerned and the main injection is triggered in an undercalibrated range up to approximately 35° (crankshaft) after top dead centre.

3. A system according to claim 1, wherein, in the mode of operation with two main injections, the pilot injection is triggered for a range from approximately 50° (crankshaft) to approximately 5° (crankshaft) ahead of top dead centre for the cylinder concerned and the main injections are triggered in an undercalibrated range from approximately 20° (crankshaft) ahead of top dead centre to approximately 120° (crankshaft) after top dead centre.

4. A system according to claim 1, wherein the control means are adapted to control the injection means in order to operate the engine with a lean mixture for approximately 60 seconds and with a rich mixture for approximately 2 seconds.

5. A system according to claim 1, wherein the engine is associated with gas inlet means for admitting gas thereto and the control means are adapted to reduce the quantity of gas admitted into the engine when the latter is operating in its regeneration mode.

6. A system according to claim 1, wherein, in the regeneration operating mode, the injection means are suitable for implementing a series of injections consisting of (i) a plurality of pilot injections comprising at least two pilot injections triggered in a crankshaft angle range from approximately 50° to approximately 5° ahead of the top dead centre of the cylinder concerned and (ii) the single main injection triggered in an undercalibrated range up to a crankshaft angle of approximately 35° after the top dead centre.

7. A system according to claim 1, wherein the predetermined load threshold value is defined by a brake mean effective pressure (BMEP) of approximately 3 bar.

8. A system according to claim 7, wherein, in the mode of operation with two pilot injections, the two pilot injections are triggered in a range from approximately 50° (crankshaft) to approximately 5° (crankshaft) ahead of top dead centre for the cylinder concerned and the main injection is triggered in an undercalibrated range up to approximately 35° (crankshaft) after top dead centre.

9. A system according to claim 7, wherein, for the engine being associated with means for recirculating exhaust gas to its inlet side, the control means are adapted to regulate the operation of the recirculation means when the engine is using a rich mixture.

10. A system according to claim 9, wherein, in the mode of operation with two pilot injections, the two pilot injections are triggered in a range from approximately 50° (crankshaft) to approximately 5° (crankshaft) ahead of top dead centre for the cylinder concerned and the main injection is triggered in an undercalibrated range up to approximately 35° (crankshaft) after top dead centre.

11. A system according to claim 9, wherein, in the mode of operation with two main injections, the pilot injection is triggered for a range from approximately 50° (crankshaft) to approximately 5° (crankshaft) ahead of top dead centre for the cylinder concerned and the main injections are triggered in an undercalibrated range from approximately 20° (crankshaft) ahead of top dead centre to approximately 120° (crankshaft) after top dead centre.

12. A system according to claim 1, wherein, for the engine being associated with means for recirculating exhaust gas to its inlet side, the control means are adapted to regulate the operation of the recirculation means when the engine is using a rich mixture.

13. A system according to claim 12, wherein, in the mode of operation with two main injections, the pilot injection is triggered for a range from approximately 50° (crankshaft) to approximately 5° (crankshaft) ahead of top dead centre for the cylinder concerned and the main injections are triggered in an undercalibrated range from approximately 20° (crankshaft) ahead of top dead centre to approximately 120° (crankshaft) after top dead centre.

14. A system according to claim 12, wherein, in the mode of operation with two pilot injections, the two pilot injections are triggered in a range from approximately 50° (crankshaft) to approximately 5° (crankshaft) ahead of top dead centre for the cylinder concerned and the main injection is triggered in an undercalibrated range up to approximately 35° (crankshaft) after top dead centre.

15. A system according to claim 7, wherein, in the mode of operation with two main injections, the pilot injection is triggered for a range from approximately 50° (crankshaft) to approximately 5° (crankshaft) ahead of top dead centre for the cylinder concerned and the main injections are triggered in an undercalibrated range from approximately 20° (crankshaft) ahead of top dead centre to approximately 120° (crankshaft) after top dead centre.

16. A system for assisting regeneration of a storage/release $NO_x$ trap integrated into an exhaust system of a motor vehicle diesel engine, which includes means for injecting fuel into the cylinders of the engine in the form of at least pilot and main injections and means for controlling the injection means to switch the engine periodically from a standard mode of operation using a lean mixture with one pilot injection and one main injection, in which $NO_x$ are stored in the trap, to a regeneration mode of operation using a rich mixture, with at least two pilot or main injections depending on the engine load, in which $NO_x$ are released from the trap and the trap is regenerated, said regeneration mode of operation comprising at least one mode of operation with two pilot injections, and wherein, in the mode of operation with two pilot injections, the two pilot injections are triggered in a range from approximately 50° (crankshaft) to approximately 5° (crankshaft) ahead of top dead centre for the cylinder concerned and the main injection is triggered in an undercalibrated range up to approximately 35° (crankshaft) after top dead centre.

17. A system according to claim 16, wherein, in the regeneration operating mode, the injection means are suitable for implementing a series of injections consisting of (i) a plurality of pilot injections comprising at least two pilot injections triggered in a crankshaft angle range from approximately 50° to approximately 5° ahead of the top dead centre of the cylinder concerned and (ii) the single main injection triggered in an undercalibrated range up to a crankshaft angle of approximately 35° after the top dead centre.

* * * * *